United States Patent

[11] 3,557,959

| [72] | Inventor | Jacques Muller<br>123 Avenue du General de Gaulle, La Garenne-Colombes, France |
|---|---|---|
| [21] | Appl. No. | 793,404 |
| [22] | Filed | Jan. 23, 1969 |
| [45] | Patented | Jan. 26, 1971 |
| [32] | Priority | Feb. 5, 1968 |
| [33] | | France |
| [31] | | 138,630 |

[54] FILTER FOR VISCOUS FLUIDS
4 Claims, 7 Drawing Figs.

[52] U.S. Cl. .................................................. 210/142,
210/184, 210/307, 210/313, 210/333, 210/345,
210/488
[51] Int. Cl. ...................................................... B01d 35/12,
B01d 25/32
[50] Field of Search ............................................ 210/333,
184, 345, 349, 488, 307, 310, 311, 313,
C.P.(Digest), 142

[56] References Cited
UNITED STATES PATENTS

| 2,544,289 | 3/1951 | Andrews | 210/349 |
| 2,767,851 | 10/1956 | Muller | 210/333X |
| 3,074,561 | 1/1963 | Mummert | 210/333 |
| 3,176,846 | 4/1965 | Adams | 210/333 |
| 3,289,839 | 12/1966 | Muller | 210/333X |
| 3,445,002 | 5/1969 | Muller | 210/333X |

*Primary Examiner*—Frank A. Spear, Jr.
*Attorney*—Arthur B. Colvin

ABSTRACT: Filtering or separating equipment, particularly that type in which a filter device consists of stacks of grooved strips through which the fluid is passed, the device having heating means to react against the fluid and having self-contained cleaning means which automatically and rapidly effect cleaning of the filter elements used in the equipment one at a time, while the filtering occurs, said cleaning means being automatically driven.

PATENTED JAN26 1971

INVENTOR
JACQUES MULLER
By
ATTORNEY

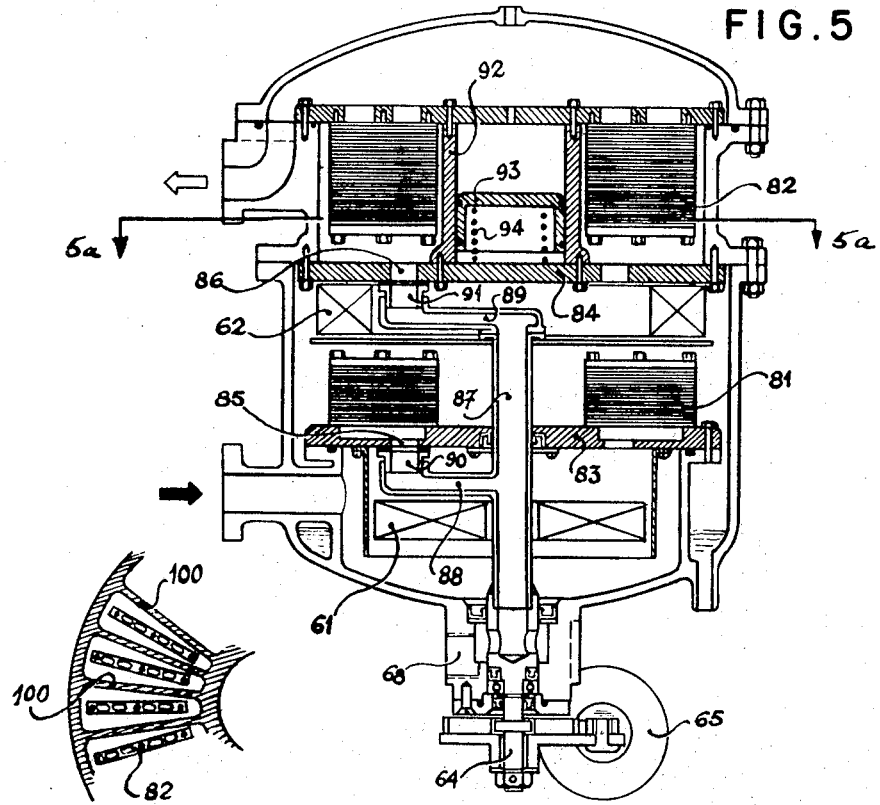
FIG. 5
FIG. 5a
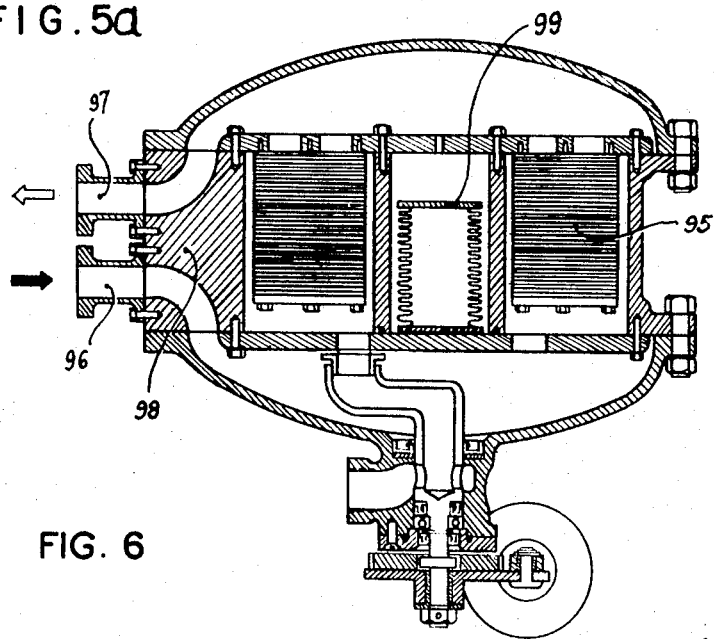
FIG. 6
INVENTOR
JACQUES MULLER
BY
ATTORNEY

FILTER FOR VISCOUS FLUIDS

This invention relates to the art of filtering equipment, more particularly of the type having an automatically operated self-contained cleaning means for the filters incorporated therein.

As conducive to an understanding of the invention, it is noted that where fluid filters or separators are used of the type, for example shown in U.S. Pat. No. 3,214,368 in which the filter device consists of a stack of grooved filter elements through which the fluid is passed, where the sediment or particles in the fluid, during use of the filters, clogs the grooves of the stack so that no further fluid can pass therethrough, if the equipment must thereupon be disassembled and the filters removed for cleaning, such procedure is extremely time consuming and reduces the efficiency of the equipment.

Where a filter is provided with self-contained cleaning means as shown in U.S. Pat. No. 3,380,591, where the equipment is used for fluid of low viscosity the filtration and cleaning action is readily performed. However, where highly viscous fluids are to be filtered such as thick lubricants or heavy fuel oils, the filters will quickly clog and by reason of the high viscosity of such oils such cleaning is extremely difficult.

It is accordingly among the objects of the invention to provide a filtering or separating equipment with self-contained cleaning means which will dependably filter high viscous fluids and dependably and rapidly effect cleaning of the plurality of the filter elements used in the equipment, one at a time, while the filtering occurs so that the continuous filtering operation will not be interrupted, which cleaning action does not require disassembly of the equipment and hence avoids the need of skilled mechanics, for this purpose.

According to the invention these objects are accomplished by the arrangement and combination of elements hereinafter described and more particularly recited in the claims.

In the accompanying drawings in which are shown one or more of various possible embodiments of the several features of the invention;

FIG. 5 is a view similar to FIG. 1 of another embodiment of the invention;

FIG. 5a is a fragmentary transverse sectional view taken along line 5a-5a of FIG. 5; and FIG. 6 is a view similar to FIG. 1 of still another embodiment of the invention.

Figure 1:
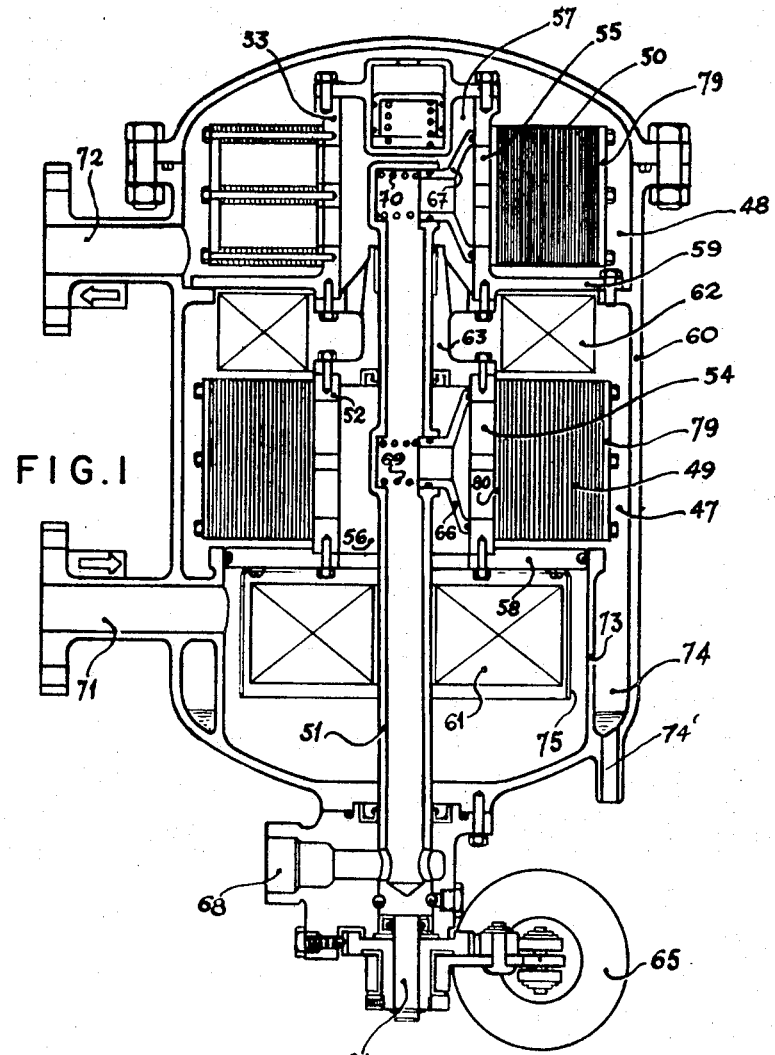
FIG. 1 is a longitudinal sectional view of a filter having an automatic cleaning system according to one embodiment of the invention.
Figure 2:
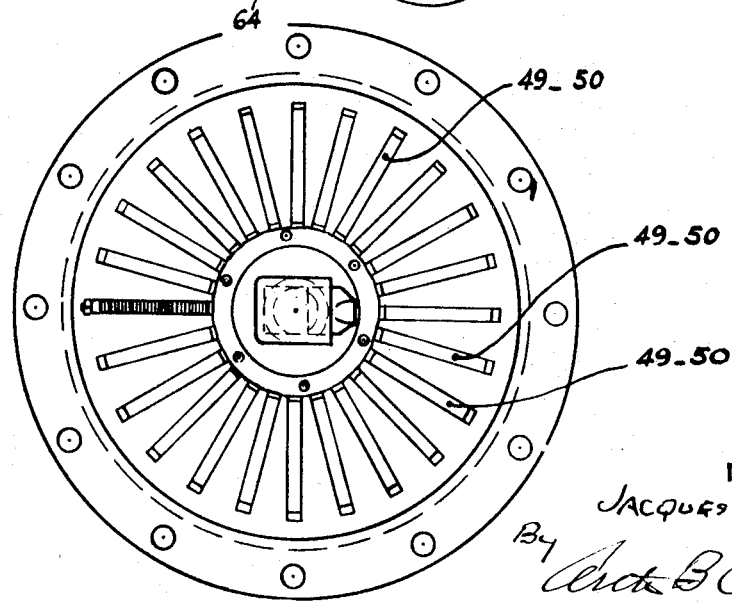
FIG. 2 is a plan view showing the arrangement of the filter elements.

Referring now to the drawings, as shown in FIG. 1, the filter comprises two stages 47 and 48 of filter blocks 49 and 50, arranged radially (FIG. 2) and concentrically to a hollow rotary shaft 51. The filter blocks are regularly spaced from each other and held on cylindrical members 52 and 53 provided with openings 54 and 55, which are in communication with circular chambers 56 and 57 closed at their upper portions. The cylindrical members rest on rings 58 and 59 forming transverse partitions in the body 60 of the filter, electric heating elements 61 and 62 being arranged on each separating ring.

Figure 3:
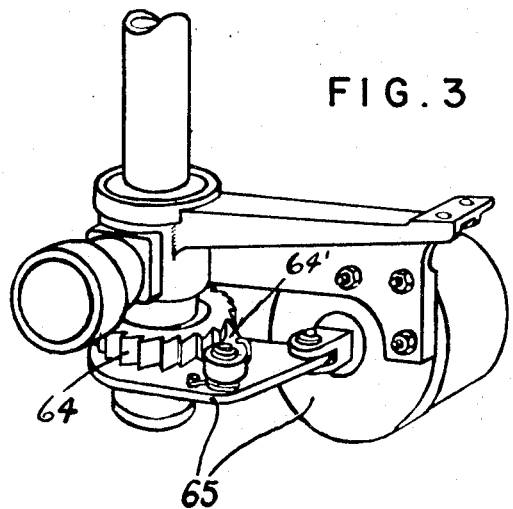
FIG. 3 is a detail perspective view on a greatly enlarged scale showing the mechanism for step-by-step rotation of the cleaning members.

The hollow shaft 51, mounted at its upper portion in a bearing 63, has a ratchet wheel 64 at its lower end, engaged by a ratchet 64' controlled by electromagnetic actuator 65 (FIG. 3) designed to produce by regular impulses, the intermittent rotation of two sweeping cones 66 and 67 in communication with the hollow shaft 51. The cones 66, 67 are positioned respectively opposite one of the filter blocks 49 and 50, one behind the other, to recover by counterflow the clogging products, the latter being removed by the hollow shaft at 68 into a vessel of any type. Opposed springs 69 and 70 insure the tight bearing of the sweeping cones on the inner face of the cylindrical pieces 52 and 53 opposite the openings 54, 55.

In addition, the body 60 of the filter is provided with an inlet tube 71 for the fluid to be purified, which leads into the body 60 beneath the separating ring 58, and an outlet tube 72 for the purified fluid discharging from the second stage of the filter blocks above the separating ring 59.

The bottom of the filter body includes a circular partition 73 to form a circular space 74 designed to receive the water of condensation or accidental water contained in the fluid to be purified; this water being removed automatically by means of an electrovalve (not shown) as soon as the water level attains a predetermined height and discharged through outlet 74'.

The method of operation of the filter is as follows:

The heavy fluid to be purified, arriving under pressure through tube 71, passes between the heating elements 61, preferably arranged in a bell jar 75 to obtain a better heating of the fluid, which must be in this first part about 80°. The fluid then passes through the chamber 56, the openings 54, into the filter blocks 49, which effect a first purification and the separation of the water which collects in the circular space 74. The fluid continues its rising flow and passes through the heating elements 62 of the second stage to be brought to a temperature of about 110° C. and flows then into the chamber 57 to pass through the filter blocks 50, which effect the complete purification, and is finally discharged through tube 72 for storage or utilization.

During the operation of the filter, the sweeping cones 66 and 67, displaced intermittently by the irregular rotation of the hollow shaft 51 are placed under the action of the ratchet device 65 in front of the openings 54 and 55 of the cylindrical members 52, 53, one behind the other, resting a certain time so that a counterflow is produced by the inlet pressure of the fluid, which has the effect of unclogging the filter blocks.

Figure 4:
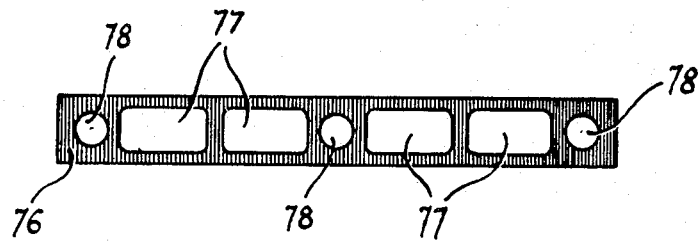
FIG. 4 is a plan view of one of the filter strips from which the filter block is formed.

The filter blocks 49, 50 can be of any type, but in the embodiment shown, the filter blocks are formed from juxtaposed strips having transverse grooves 76 (FIG. 4) which insure, by throttling the fluid, a better filtration. Each of the strips has several openings 77 which form ducts in each block through which the fluid to be purified passes before it flows into the grooves to issue to the outside. Holes 78 are provided in each of the strips for the passage of locking bolts between two end plates 79 and 80.

The embodiment shown in FIG. 5 comprises filter blocks 81 and 82 mounted directly on transverse separating plates 83 and 84 which are provided with holes 85 and 86 arranged in a circle opposite the filter blocks through which the fluid passes.

In this embodiment, which is similar to the embodiment of FIGS. 1 to 4 with corresponding parts having the same reference numerals, a hollow rotary shaft 87 is provided with arms 88 and 89 terminated by sliding sealing rings 90 and 91 which are intermittently actuated to lie opposite the holes 85 and 86, one behind the other to achieve the unclogging of the filter blocks by counterflow, as in the preceding embodiment, the blocks 82 being placed respectively in the cells 100.

The second filtration stage also includes a central cylinder 92 in which is arranged a piston 93 urged by a calibrated spring 94. This device has the function of compensating the underpressure produced naturally during the cleaning by counterflow.

Finally, in the embodiment of FIG. 6, the filter comprises only one stage of filter blocks 95, similar to the filter blocks previously described and in this case the inlet and outlet tubes 96 and 97 for the fluid are arranged close together, separated only by a partition 98. The heating means, the unclogging means by counterflow, and the compensating device are the same as in the two preceding embodiments.

Naturally, the embodiments described and represented above can be modified in any desired manner without departing from the spirit of the invention.

The electromagnet acting on the ratchet can be replaced, for example, by a pneumatic or hydraulic piston valve, the latter being actuated by the filter circuit itself, hence without using any other energy source, such as a hydraulically-operated turbine under the action of the circulation of the liquid to be filtered or already filtered.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

I claim:

1. Equipment for filtering particles from fluid comprising a container having two spaced parallel separating plates positioned therein defining a lower chamber, an upper chamber and an intermediate chamber, said lower and upper chambers each having a port defining respectively an inlet port to which a source of fluid under pressure may be connected and an outlet port, a rotatably mounted hollow shaft extending axially in said container through said plates, said shaft having a discharge port, cylindrical supporting members positioned respectively in the intermediate chamber and in the uppermost chamber, said plates having passageways for flow of fluid from said lower chamber into said cylindrical supporting member in said intermediate chamber and from said intermediate chamber into the cylindrical supporting member in said uppermost chamber, each supporting member having a plurality of circumferentially spaced openings in the wall thereof, a plurality of stacks of filter elements extending radially outward from each of said supporting members and circumferentially spaced therearound, each of said filter elements comprising a stack of juxtaposed plates each having grooves in the faces thereof leading to the exterior of the stack, and a passageway therethrough in communication with the inner ends of a plurality of said grooves, the passageway in each of said filter elements extending radially therethrough, being closed at its outer end and having its inner end in communication with an associated opening in an associated supporting member, said openings in said supporting members defining the inlets to the passageways in said filter elements, a pair of radially extending discharge arms secured to said hollow shaft and spaced therealong, said discharge arms each having a passageway therethrough in communication with the interior of said hollow shaft, the outer end of each of said discharge arms having a mouth adapted successively to encompass the inlet openings in said supporting members as said shaft is intermittently rotated, successively to cut off communication between the passageways of one of the stacks and said lowermost chamber while retaining the passageways in the other stacks in communication with said lowermost chamber and to connect said first passageway through said hollow shaft to said discharge port, whereby the filtered fluid under pressure in said uppermost chamber will flow in reverse direction through said first filter in communication with said discharge port for cleaning of said filter, and heating means positioned in said lowermost chamber and intermediate chamber to heat the fluid as it passes from said inlet port into said filters.

2. The combination set forth in claim 1 in which each of said discharge arms is slidably mounted on said hollow shaft and resilient means are provided to urge said arms radially outward to provide a seal between the mouth of each of said arms and the inner surface of each of said cylindrical supporting members.

3. The combination set forth in claim 1 in which a ratchet wheel is secured to the lower end of said rotary hollow shaft, a ratchet arm engages said ratchet wheel and means are provided for intermittently actuating said ratchet arm to effect step by step rotation of said shaft.

4. The combination set forth in claim 1 in which an annular cavity is provided in said lowermost chamber in communication with the intermediate chamber whereby water collected in said intermediate chamber will flow into said annular cavity, said annular cavity having a discharge outlet.